United States Patent [19]

Inoue et al.

[11] Patent Number: 4,675,365

[45] Date of Patent: Jun. 23, 1987

[54] ROOM TEMPERATURE-CURABLE POLYMERIC COMPOSITION

[75] Inventors: Yoshio Inoue; Masatoshi Arai; Takeo Inoue; Atsushi Yaginuma, all of Annaka; Tetsuo Tomizawa, Takasaki, all of Japan

[73] Assignee: Shin-Etsu Chemical Co., Ltd., Tokyo, Japan

[21] Appl. No.: 848,986

[22] Filed: Apr. 7, 1986

[30] Foreign Application Priority Data

Apr. 17, 1985 [JP] Japan .................................. 60-81991

[51] Int. Cl.$^4$ ............................................. C08G 65/32
[52] U.S. Cl. ...................................... 525/408; 525/50; 528/18; 528/26; 528/26.5; 528/34
[58] Field of Search ..................... 525/50, 408; 528/18, 528/26, 26.5, 34

[56] References Cited

U.S. PATENT DOCUMENTS 4,302,571  11/1981  Arai et al. ............................. 528/34

Primary Examiner—Melvyn I. Marquis
Attorney, Agent, or Firm—Hopgood, Calimafde, Kalil, Blaustein & Judlowe

[57] ABSTRACT

The room temperature-curable polymeric composition is prepared by admixing (a) a polyether terminated at both molecular chain ends each with a mercapto group with (b) a 3-methacryloxypropyl silane having at least two hydrolyzable groups, e.g. alkoxy groups, in a molecule and (c) a 1,1,3,3-tetramethyl guanidino-containing organosilicon compound. The component (b) first reacts with the mercapto group of the component (a) to introduce silicon-bonded hydrolyzable groups to the molecular chain ends of the polyether and the silicon-bonded hydrolyzable groups pertain to the crosslinking reaction with the atmospheric moisture. The composition has good storability and workability and is capable of giving a cured rubbery elastomer without the addition of a toxic lead compound as a curing catalyst which is indispensable in the conventional polyether-based room temperature-curable polymeric compositions.

7 Claims, No Drawings

ROOM TEMPERATURE-CURABLE POLYMERIC COMPOSITION

BACKGROUND OF THE INVENTION

The present invention relates to a room temperature-curable polymeric composition or, more particularly, to a polyether-based polymeric composition curable at room temperature by reacting with atmospheric moisture having good workability even at a relatively low temperature.

Room temperature-curable polymeric compositions based on a polymer, in particular, having mercapto groups at the molecular chain ends are well known in the art and widely used as a so-called polysulfide-type sealing composition, for example, in building works. These room temperature-curable polymeric compositions based on a mercapto-terminated polymer have several disadvantages to be improved. For example, the consistency of the composition is greatly increased at a low temperature as is the case in outdoor works in winter so that the composition can be worked only with extreme difficulties. In addition, the room temperature-curing reaction of the composition must be accelerated by use of a strongly toxic lead-containing oxidizing agent as a curing agent to cause a serious problem on the workers' health.

Room temperature-curable polymeric compositions of which the principal polymeric constituent is a polyether terminated at both molecular chain ends each with a mercapto group have been disclosed in Japanese Patent Publication No. 52-34667. Although such a polyether-based room temperature-curable composition is somewhat improved in respect of the workability at low temperatures, the curing agent effective in such a composition is still a strongly toxic lead-containing oxidizing agent. Moreover, the compositions are usually formulated and supplied in two packages separately containing the main ingredients and the curing agent and the contents of the two packages are mixed together directly before use so that some inconvenience is unavoidable in the use thereof since, although a one-package formulation by mixing all of the necessary ingredients beforehand is known, compositions of such a one-package formulation necessarily suffer remarkable decrease in the curing velocity in comparison with the compositions of the two-package formulation.

SUMMARY OF THE INVENTION

Thus, the present invention has an object to provide a novel polyether-based room temperature-curable polymeric composition free from the above described problems and disadvantages and the inventive room temperature-curable polymeric composition comprises:

(a) 100 parts by weight of a polyether terminated at both molecular chain ends each with a mercapto group and having a number-average molecular weight in the range from 500 to 20,000;

(b) an organosilicon compound represented by the general formula

$$CH_2=CR-CO-O-(CH_2)_n SiMe_m X_{3-m}, \quad (I)$$

in which Me is a methyl group, R is a hydrogen atom or a methyl group, X is a hydrolyzable group, n is a number of 1, 2 or 3 and m is a number of zero or 1, in an amount of 0.5 to 10 moles per mole of the mercapto groups in the polyether as the component (a); and (c) from 0.1 to 10 parts by weight of an organosilicon compound having, in a molecule, at least one 1,1,3,3-tetramethyl guanidino group of the formula $(Me_2N)_2C=N-$, in which Me is a methyl group.

DETAILED DESCRIPTION OF THE PREFERRED EMBODIMENTS

As is understood from the above given summarizing description, the polyether-based room temperature-curable polymeric composition is characteristically formulated by admixing two kinds of specific organosilicon compounds of which the first is a (meth)acryloxyalkyl-containing organosilane compound of the general formula (I) having two or three hydrolyzable groups denoted by X in a molecule and the second is a tetramethyl guanidino-containing organosilicon compound. By the aid of the catalytic activity of the guanidino-containing organosilicon compound, the (meth)acryloxyalkyl-containing organosilane compound first reacts at room temperature with the mercapto group at the molecular chain end of the polyether as the component (a) to form an addition compound according to the following reaction equation:

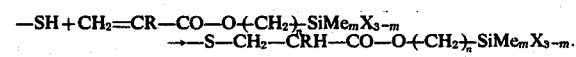

$-SH + CH_2=CR-CO-O-(CH_2)_n SiMe_m X_{3-m}$
$\rightarrow -S-CH_2-CRH-CO-O-(CH_2)_n SiMe_m X_{3-m}.$ This means that each of the polyether molecules is provided at the molecular chain end with two or three silicon-bonded hydrolyzable groups denoted by X which then pertain to the crosslink formation between molecules by the reaction with atmospheric moisture. The composition is stable and storable under a hermetically sealed condition to exclude atmospheric moisture so that all of the components (a) to (c) can be mixed together in advance to give a one-package supply.

The component (a) is a polyether terminated at both molecular chain ends each with a mercapto group to have two mercapto groups in a molecule. Such a polyether can be easily prepared according to a known method utilizing the esterification reaction, for example, between a mercapto-substituted carboxylic acid and alcoholic hydroxy groups at the molecular chain ends of a polyether. The polyether should have a number-average molecular weight, preferably, in the range from 500 to 20,000. When the polyether has a molecular weight lower than 500, cured products of the composition can hardly be used in practical applications due to brittleness. When the polyether, to which the mercapto groups should be introduced, has a too large molecular weight, the reactivity of the terminal hydroxy groups is decreased so that the desired reaction with the mercapto-substituted carboxylic acid cannot proceed quantitatively. The basic structure of the mercapto-terminated polyether molecule can include polyoxypropylene linkages, polyoxypropylene-polyoxyethylene mixed linkages and polyoxybuthylene linkages exemplarily expressed by the following formulas:

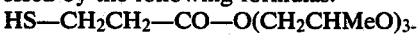

$HS-CH_2CH_2-CO-O(CH_2CHMeO)_{30}$
$OCO-CH_2CH_2-SH$;

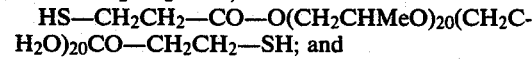

$HS-CH_2CH_2-CO-O(CH_2CHMeO)_{20}(CH_2CH_2O)_{20}CO-CH_2CH_2-SH$; and

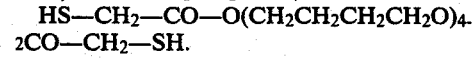

$HS-CH_2-CO-O(CH_2CH_2CH_2CH_2O)_{42}CO-CH_2-SH.$

The component (b) comprised in the inventive composition is a (meth)acryloxyalkyl-containing organosilane having at least two hydrolyzable groups in a molecule and represented by the general formula (I). In the formula, R is a hydrogen atom or a methyl group and X is a hydrolyzable group exemplified by alkoxy groups, alkenyloxy groups and those groups expressed by the formulas —NH—Ph, —N=CMeEt, —NEt—CO—Me, —O—NEt$_2$ and the like, in which Me, Et and Ph denote methyl, ethyl and phenyl groups, respectively. The subscript n is a number of 1, 2 or 3 and the subscript m is a number of zero or 1 so that the silane compound has two or three hydrolyzable groups denoted by X. Several examples of the silane compound suitable as the component (b) include those compounds expressed by the following structural formulas, in which the symbols Me, Et and Vi denote methyl, ethyl and vinyl groups, respectively:

Vi—CO—O—CH$_2$CH$_2$CH$_2$Si(OMe)$_3$; Vi—CO—O—CH$_2$CH$_2$Si(OME)$_3$; Vi—CO—O—CH$_2$Si(OMe)$_3$; Vi—CO—O—CH$_2$CH$_2$CH$_2$Si(Me)(OMe)$_2$; CH$_2$=CMe—CO—O—CH$_2$CH$_2$CH$_2$Si(OMe)$_3$; CH$_2$=CMe—CO—O—CH$_2$CH$_2$CH$_2$Si(OEt)$_3$; CH$_2$=CMe—CO—O—CH$_2$CH$_2$Si(OMe)$_3$CH$_2$CH$_2$=CMe—CO—O—CH$_2$Si(OMe)$_3$; CH$_2$=CMe—CO—O—CH$_2$CH$_2$CH$_2$Si(Me)(OMe)$_2$; CH$_2$=CMe—CO—O—CH$_2$CH$_2$CH$_2$Si(O—C-Me=CH$_2$)$_3$; CH$_2$=CMe—CO—O—CH$_2$CH$_2$CH$_2$Si(-Me)(O—CMe=CH$_2$)$_2$; and CH$_2$=CMe—CO—O—CH$_2$CH$_2$CH$_2$Si(Me)-(O—CEt=CH$_2$)$_2$.

The amount of the (meth)acryloxyalkyl-containing organosilane compound as the component (b) in the inventive composition should be in the range from 0.5 to 10 moles or, preferably, from 2 to 5 moles per mole of the mercapto groups in the mercapto-terminated polyether as the component (a). When the amount of the component (b) is too small, the composition cannot have sufficient curability. When the amount thereof is too large, on the other hand, cured products of the composition would have poor properties as an elastomer with a greatly decreased mechanical strength.

The component (c), which is a catalytic ingredient to promote the reaction between the components (a) and (b), is an organosilicon compound having, in a molecule, at least one 1,1,3,3-tetramethyl guanidino group of the formula (Me$_2$N)$_2$C=N—, Me being a methyl group. The compound may be an organosilane or an organopolysiloxane including the compounds expressed by the following structural formulas, in which the symbols Me, Et and G denote methyl, ethyl and 1,1,3,3-tetramethyl guanidino groups, respectively:

G—CH$_2$CH$_2$CH$_2$Si(OMe)$_3$; G—CH$_2$CH$_2$CH$_2$Si(OSiMe$_3$)$_3$; G—CH$_2$Si(OEt)$_3$; and Me$_3$Si—O—SiMe$_2$+O—Si(CH$_2$CH$_2$CH$_2$+G)Me$_2$+O-SiMe$_3$.

The amount of the component (c) comprised in the inventive composition should be in the range from 0.1 to 10 parts by weight or, preferably, from 0.5 to 5 parts by weight per 100 parts by weight of the mercapto-terminated polyether as the component (a). When the amount of the component (c) is smaller than 0.1 part by weight, the desired catalytic effect can hardly be exhibited. When the amount thereof is too large, on the other hand, cured products obtained from the composition would have a poor mechanical strength as an elastomer.

The room temperature-curable polymeric composition of the invention is prepared by uniformly blending the above described components (a), (b) and (c). It is optional in order to increase the mechanical strength of the cured product of the composition that the composition is admixed with a filler such as a finely divided fumed or precipitated silica filler, optionally, surface-treated with a silazane, low-molecular dimethylpolysiloxane and the like, quartz powder, diatomaceous earth, titanium dioxide, aluminum oxide, lead oxide, iron oxide, carbon black, bentonite, graphite powder, calcium carbonate, mica flakes, clay, glass beads, glass microballoons, glass fibers, beads of polyvinyl chloride, polystyrene, acrylic resin and the like, and others as well as a known condensation catalyst to promote the crosslink formation in the composition. Other additives may be admixed according to need including adhesion improvers, e.g. silane coupling agents, thixotropy modifiers, fungicides, ultraviolet absorbers, aging retarders, heat-resistance improvers and others.

The inventive composition obtained in the above described manner can rapidly be cured into a rubbery elastomer even at room temperature when it is exposed to the ambient atmosphere containing moisture and no toxic curing catalyst such as a lead oxide need not be added to the composition to cause no safety problem on the worker's health. In addition, the inventive composition can be supplied in one package containing all of the necessary components mixed together in advance and the composition has workability even at low temperatures in winter. Accordingly, the inventive composition is very useful as a sealing or caulking material and adhesive in building works.

In the following, the room temperature-curable polymeric composition is illustrated in more detail by way of examples preceded by the description of the preparation of the mercapto-terminated polyethers used in the Examples. In the Examples given below, the expression of "parts" always refers to "parts by weight" and the values of viscosity all refer to those obtained by the measurement at 25° C. Preparation of polyethers.

A reaction mixture was prepared in a reaction vessel by mixing 200 g of a polypropylene glycol having a number-average molecular weight of 2000, 200 g of toluene, 21.2 g of 3-mercaptopropionic acid, 2.4 g of p-toluenesulfonic acid and 0.1 g of methoxy hydroquinone and the mixture was heated under reflux while the water produced by the reaction was continuously distilled out of the mixture. After completion of the reaction, the reaction mixture was neutralized by adding 15 g of sodium hydrogencarbonate and heating under agitation for 2 hours at 80° C. followed by filtration and then the solvent was removed therefrom under reduced pressure to give 1950 g of a clear, light yellow liquid as a product, which is referred to as the polyether A hereinbelow.

This product had a viscosity of 490 centistokes, specific gravity of 1.023 and refractive index of 1.4561 at 25° C. and contained 2.9% by weight of mercapto groups corresponding to an average structural formula given below:

HS—CH$_2$CH$_2$—CO—O(CH$_2$CHMeO)$_3$.
5CO—CH$_2$CH$_2$—SH.

Further, three more mercapto-terminated polyethers, referred to as the polyethers B, C and D hereinbelow, were prepared in substantially the same manner as above excepting the replacement of the starting polyether and the mercapto-substituted carboxylic acid and corresponding modification of the relative amounts of the reactants. These polyethers B, C and D were clear, light yellow liquids having viscosities of 3500, 6200 and 5000 centistokes, respectively, and expressed by the following respective average structural formulas.

Polyether B: HS—CH$_2$CH$_2$—CO—O(CH$_2$CHMeO)$_{6.9}$CO—CH$_2$CH$_2$—SH

Polyether C: HS—CH$_2$CH$_2$—CO—O(CH$_2$CHMeO)$_{20}$(CH$_2$CH$_2$O)$_{20}$CO—CH$_2$CH$_2$SH Polyether D: HS—CH$_2$—CO—O(CH$_2$CH$_2$CH$_2$CH$_2$O)$_{42}$CO—CH$_2$—SH

EXAMPLE 1

A pasty base blend was prepared by uniformly mixing 290 parts of the polyether A, 520 parts of calcium carbonate and 100 parts of dioctyl phthalate.

A 100 parts portion of the thus obtained base blend was admixed with 10 parts of 3-methacryloxypropyl trimethoxy silane and 1 part of 3-(1,1,3,3-tetramethyl guanidino)propyl trimethoxy silane under an anhydrous condition to give a curable composition, referred to as the composition I hereinbelow, which was kept in a vessel under a hermetically sealed condition.

The composition I was squeezed out of the vessel and spread in a sheet-like form of 2 mm thickness which was kept standing at 20° C. in an atmosphere of 55% relative humidity. The surface of the sheet became tack-free within about 20 minutes and the sheet was converted into a rubber sheet after standing for 7 days under the same conditions as above. The thus obtained rubber sheet had a hardness of 30, tensile strength of 14 kg/cm$^2$ and ultimate elongation of 310% as determined according to the procedure specified in JIS K 6301. Example 2.

The polyethers B, C and D were each admixed with calcium carbonate filler and dioctyl phthalate in the same formulation as in the case with the polyether A in the preceding example to give a base blend. Each a 100 parts portion of the base blends was admixed with 10 parts of a 3-methacryloxypropyl-containing silane compound a, b, c or d specified below and 1 part of a 1,1,3,3-tetramethyl guanidino-containing organosilicon compound I, II or III specified below according to the combination indicated in Table 1 to give curable polymeric compositions II, III, IV, V, VI and VII. These compositions were each shaped into a sheet of 2 mm thickness and kept standing for 7 days at 20° C. in an atmosphere of 55% relative humidity to give a cured rubber sheet having mechanical properties shown in Table 1.

3-Methacryloxypropyl-containing silane a : 3-Methacryloxypropyl trimethoxy silane
b : 3-Methacryloxypropyl methyl dimethoxy silane
c : 3-Methacryloxypropyl methyl di(isopropenyloxy) silane
d : 3-Methacryloxypropyl tri(isopropenyloxy) silane

Guanidino-Containing Organosilicon Compound

I: 3-(1,1,3,3-Tetramethyl guanidino)propyl trimethoxy silane
II: 1,1,3,3-Tetramethyl guanidino methyl triethoxy silane
III: An organopolysiloxane of the formula

in which Me and G are methyl and 1,1,3,3-tetramethyl guanidino groups, respectively.

TABLE 1

| Composition | II | III | IV | V | VI | VII |
| --- | --- | --- | --- | --- | --- | --- |
| Polyesther | B | B | B | B | C | D |
| 3-Methacryloxypropyl silane | a | b | c | d | a | a |
| Guanidino-containing compound | I | I | I | II | III | III |
| Properties |  |  |  |  |  |  |
| Hardness, JIS | 25 | 20 | 20 | 27 | 25 | 28 |
| Ultimate elongation % | 300 | 450 | 400 | 230 | 260 | 380 |
| Tensile strength, kg/cm$^2$ | 9 | 14 | 15 | 10 | 8 | 12 |

What is claimed is:

1. A room temperature-curable polymeric composition which comprises:
   (a) 100 parts by weight of a polyether terminated at both molecular chain ends with a mercapto group wherein the mecrapto group is a ω-mercapto-substituted carboxylate bonded to the chain ends through an ester linkage and having a number-average molecular weight in the range from 500 to 20,000;
   (b) an organosilicon compound represneted by the general formula

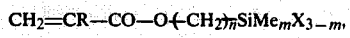

in which Me is a methyl group, R is a hydrogen atom or a methyl group, X is a hydrolyzable group, the subscript n is a number of 1, 2 or 3 and the subscript m is a number of zero or 1, in an amount in the range from 0.5 to 10 moles per mole of the mercapto groups in the polyether as the component (a); and
   (c) from 0.1 to 10 parts by weight of an organosilcon compound having at least one 1,1,3,3-tetramethyl guanidino group in a molecule.

2. The room temperature-curable polymeric composition as claimed in claim 1 wherein the group denoted by R in the organosilicon compound as the component (b) is a methyl group.

3. The room temperature-curable polymeric composition as claimed in claim 1 wherein the subscript n in the general formula representing the organosilicon compound as the component (b) is 3.

4. The room temperature-curable polymeric composition as claimed in claim 1 wherein the hydrolyzable group denoted by X in the general formula representing the organosilicon compound as the component (b) is an alkoxy group or an alkenyloxy group.

5. The room temperature-curable polymeric composition as claimed in claim 1 wherein the 1,1,3,3-tetramethyl guanidino group contained in the organosilicon compound as the component (c) is bonded to a silicon atom of the compound through an alkylene group.

6. The room temperature-curable polymeric composition as claimed in claim 1 wherein the amount of the component (b) is in the range from 2 to 5 moles per mole of the mercapto groups in the polyether as the component (a).

7. The room temperature-curable polymeric composition as claimed in claim 1 wherein the amount of the component (c) is in the range from 0.5 to 5 parts by weight per 100 parts by weight of the component (a).

* * * * *